United States Patent [19]
Rollmann et al.

[11] 4,423,021
[45] Dec. 27, 1983

[54] METHOD OF PREPARING SILICO-CRYSTAL ZSM-48

[75] Inventors: Louis D. Rollmann, Princeton, N.J.; Ernest W. Valyocsik, Yardley, Pa.

[73] Assignee: Mobil Oil Corporation, New York, N.Y.

[21] Appl. No.: 207,897

[22] Filed: Nov. 18, 1980

Related U.S. Application Data

[63] Continuation of Ser. No. 64,703, Aug. 8, 1979, abandoned, which is a continuation-in-part of Ser. No. 13,640, Feb. 21, 1979, abandoned.

[51] Int. Cl.$^3$ .................. C01B 33/20; C01B 33/32
[52] U.S. Cl. .................. 423/333; 260/448 C; 423/326; 423/329; 423/332; 423/335; 423/339
[58] Field of Search .................. 423/326–333, 423/335, 339; 260/448 C; 252/431 N, 455 Z

[56] References Cited

U.S. PATENT DOCUMENTS

| | | | |
|---|---|---|---|
| 3,709,979 | 1/1973 | Chu | 423/328 |
| 3,832,449 | 8/1974 | Bosinski et al. | 423/328 |
| 4,104,294 | 8/1978 | Grose et al. | 260/448 C |
| 4,107,195 | 8/1978 | Rollmann | 260/448 C |
| 4,108,881 | 8/1978 | Rollmann et al. | 260/448 C |
| 4,112,056 | 9/1978 | Chen et al. | 423/329 |
| 4,139,600 | 2/1979 | Rollmann et al. | 423/329 |
| 4,151,189 | 4/1979 | Rubin et al. | 260/448 C |
| 4,205,053 | 5/1980 | Rollmann et al. | 423/329 |

FOREIGN PATENT DOCUMENTS

1365318 8/1974 United Kingdom ............... 423/329

*Primary Examiner*—Edward J. Meros
*Attorney, Agent, or Firm*—Alexander J. McKillop; Michael G. Gilman; Charles J. Speciale

[57] ABSTRACT

A new porous silico-crystal, a method of making same and the use thereof in catalytic conversion of organic compounds. The new product has a composition, expressed in terms of moles of anhydrous oxides per 100 moles of silica as follows:

(0 to 15)RN : (0 to 1.5)$M_{2/n}O$ : (0-2)$Al_2O_3$ : (100)$SiO_2$ wherein M is at least one cation having a valence n, RN is a $C_1$–$C_{20}$ organic compound, having at least one amine functional group of $pK_a \geq 7$ and wherein the zeolite is characterized by the distinctive X-ray powder diffraction pattern shown in Table I. The new silico-crystal is prepared from a reaction mixture comprising a source of silica, $C_1$–$C_{20}$ organic compounds, as defined above, with or without a source of alumina, and water.

2 Claims, 4 Drawing Figures

X-ray Diffraction Pattern of Product of Example 5

X-ray Diffraction Pattern of Calcined and Na-Exchanged ZSM-48 (Example 29)

X-ray Diffraction Pattern of Calcined and Na-Exchanged ZSM-48 (EXAMPLE 30)

METHOD OF PREPARING SILICO-CRYSTAL ZSM-48

CROSS-REFERENCE TO RELATED APPLICATION

This application is a continuation of application Ser. No. 064,703 filed Aug. 8, 1979 which is a continuation-in-part of application Ser. No. 013,640 filed Feb. 21, 1979, both now abandoned.

BACKGROUND OF THE INVENTION

1. Field of the Invention

This invention relates to a novel porous silico-crystal, designated as ZSM-48, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal, an alkaline earth metal cation, or an organic species such as a quaternary ammonium cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), and zeolite ZSM-12 (U.S. Pat. No. 3,832,449), merely to name a few.

The $SiO_2/Al_2O_3$ ratio of a given zeolite is often variable. For example, zeolite X can be synthesized with $SiO_2/Al_2O_3$ ratio of from 2 to 3; zeolite Y, from 3 to about 6. In some zeolites the upper limit of $SiO_2/Al_2O_3$ ratio is unbounded. ZSM-5 is one such example wherein $SiO_2/Al_2O_3$ ratio is at least five. U.S. Pat. No. 3,941,871 discloses a crystalline metal organosilicate essentially free of aluminum and exhibiting an X-ray diffration pattern characteristic of ZSM-5 type aluminosilicates. U.S. Pat. Nos. 4,061,724, 4,073,865 and 4,104,294 describe microporous, crystalline silicas or organosilicates.

SUMMARY OF THE INVENTION

The present invention is directed to a novel porous silico-crystal, designated as ZSM-48, a method for its preparation, and the conversion of organic compounds contacted therewith.

The porous silico-crystal composition ZSM-48 can be identified, in terms of moles of anhydrous oxides per 100 moles of silica as follows:

(0 to 15)RN: (0 to 1.5)$M_{2/n}O$: (0 to 2)$Al_2O_3$: (100)$SiO_2$ wherein M is at least one cation having a valence n, RN is a $C_1$–$C_{20}$ organic compound having at least one amine functional group of $pK_a \geq 7$, and wherein the composition is characterized by the distinctive X-ray diffraction pattern as shown in Table 1 below.

It is recognized that, particularly when the composition contains tetrahedral, framework aluminum, a fraction of the amine functional groups may be protonated. The doubly protonated form, in conventional notation, would be $(RNH)_2O$ and is equivalent in stoichiometry to $RN + H_2O$.

The original cations can be replaced, at least in part, by calcination and/or ion exchange with another cation. Thus, the original cations are exchanged into a hydrogen or hydrogen ion precursor form or a form in which the original cation has been replaced by a metal of Groups 2 through 8 of the Periodic Table. Thus, for example it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction pattern of the ZSM-48 silico-crystal of the present invention has the following significant lines:

TABLE 1

| Significant Lines of ZSM-48 | |
|---|---|
| d(A) | Relative Intensity[a] |
| 11.8 ± 0.2 | W–VS |
| 10.2 ± 0.2 | W–M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

[a]Relative intensity symbols: W = Weak, M = Medium, VS = Very Strong

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. In Table 1 the relative intensities are given in terms of the symbols W=weak, VS=very strong and W-S=weak-to-strong. Ion exchange of the sodium ion with cations rveals substantially the same pattern with some minor shafts in interplanar spacing and variation in relative intensity. Other minor variations can occur depending on the silicon to aluminum ratio of the particular sample, as well as if it has been subjected to thermal treatment.

The new product can be prepared from a reaction mixture containing a source of silica, RN, an alkali metal oxide, e.g. sodium, water, and optionally alumina, and having a composition, in terms of mole ratios of oxides, falling within the following ranges:

| REACTANTS | | BROAD | PREFERRED |
|---|---|---|---|
| $Al_2O_3/SiO_2$ | = | 0 to 0.02 | 0 to 0.01 |
| $Na/SiO_2$ | = | 0 to 2 | 0.1 to 1.0 |
| $RN/SiO_2$ | = | 0.01 to 2.0 | 0.05 to 1.0 |
| $OH^-/SiO_2$ | = | 0 to 0.25 | 0 to 0.1 |
| $H_2O/SiO_2$ | = | 10 to 100 | 20 to 70 |
| $H^+$(added)/$SiO_2$ | = | 0 to 0.2 | 0 to 0.05 | wherein RN is a $C_1$-$C_{20}$ organic compound having amine functional group of $pK_a \geq 7$, and maintaining the mixture at 80°-250° C. until crystals of the silico material are formed. $H^+$(added) is moles acid added in excess of the moles of hydroxide added. In calculating $H^+$(added) and OH values, the term acid ($H^+$) includes both hydronium ion, whether free or coordinated, and aluminum. Thus aluminum sulfate, for example, would be considered a mixture of aluminum oxide, sulfuric acid, and water. An amine hydrochloride would be a mixture of amine and HCl.

The silico-crystal can also be used as a catalyst in intimate combination with an additional hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, to the extent as in the structure, impregnated therein or physically intimately admixed therewith. Such component can be impregnated in or on to it such as, for example, by, in the case of platinum, treating the silico-crystal with a solution containing a platinum metal-containing ion. Thus, suitable platinum compounds include chloroplatinic acid, platinous chloride and various compounds containing the platinum ammine complex.

The above silico-crystal especially in its metal, hydrogen, ammonium, alkylammonium and arylammonium forms can be beneficially converted to another form by thermal treatment. This thermal treatment is generally performed by heating one of these forms at a temperature of at least 100° F. for at least 1 minute and generally not greater than 20 hours. While subatmospheric pressure can be employed for the thermal treatment, atmospheric pressure is desired for reasons of convenience. The thermal treatment can be performed at a temperature up to about 700° C. The thermally treated product is particularly useful in the catalysis of certain hydrocarbon conversion reactions.

The new silico-crystal ZSM-48 when employed either an as adsorbent or as a catalyst in one of the aforementioned processes should be dehydrated, at least partially. This can be done by heating to a temperature in the range of 100° to 600° C. in an atmosphere, such as air, nitrogen, etc. and at atmospheric, subatmospheric or superatmospheric pressures for between 1 and 48 hours. Dehydration can also be performed at room temperature merely by placing the ZSM-48 type catalyst in a vacuum, but a longer time is required to obtain a sufficient amount of dehydration.

DESCRIPTION OF PREFERRED EMBODIMENTS

Figure 1:
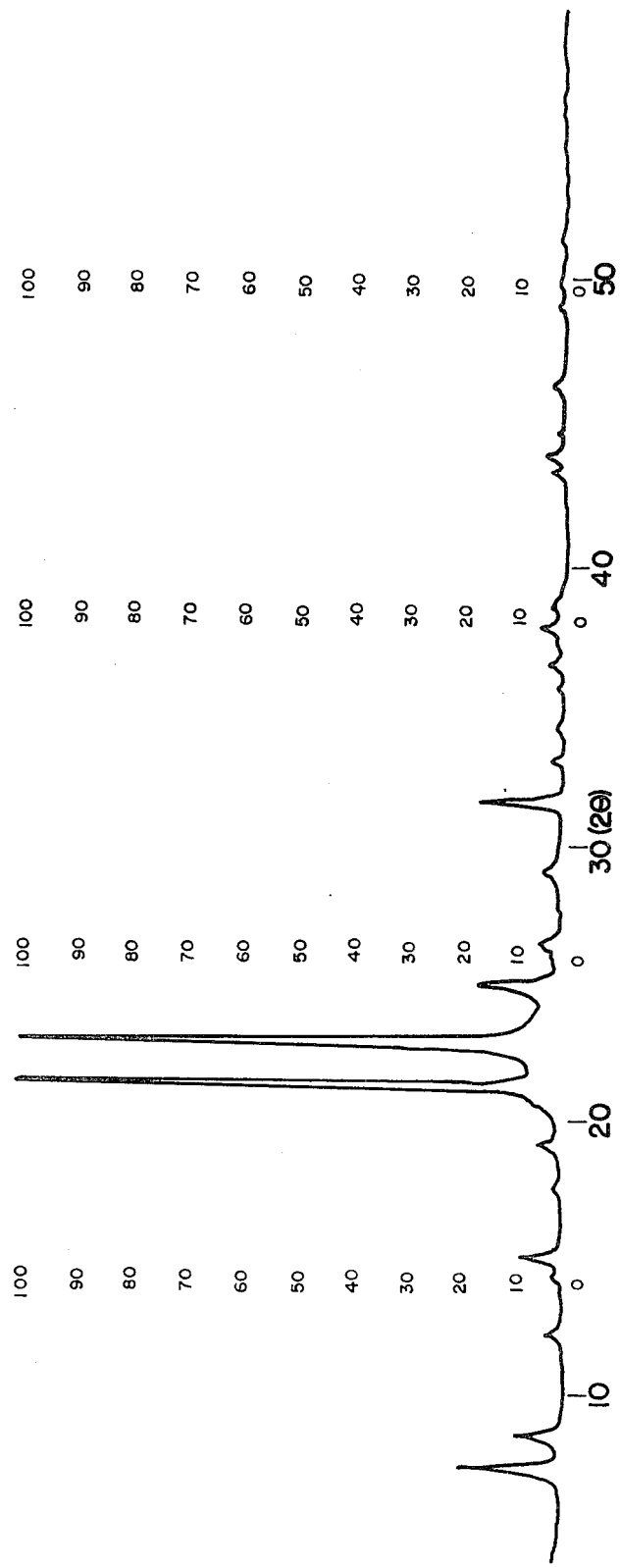

Preferably, crystallization is carried out under pressure in an autoclave or static bomb reactor, at 80 to 250° C. Thereafter, the crystals are separated from the liquid and recovered. The composition can be prepared utilizing materials which supply the appropriate oxide. Such compositions include sodium silicate, silica hydrosol, silica gel, silicic acid, RN, sodium hydroxide, sodium chloride, aluminum sulfate, sodium aluminate, aluminum oxide, or aluminum itself. RN is a $C_1$-$C_{20}$ organic compound containing at least one amine functional group of $pK_a \geq 7$ and includes such compounds as $C_3$-$C_{18}$ primary, secondary, and tertiary amines, cyclic amine, such as piperidine, pyrrolidine and piperazine, and polyamines such as $NH_2-C_nH_{2n}-NH_2$ wherein n is 4-12.

In the case of many catalysts it is desired to incorporate the new product with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new composition i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g. bentonite and kaolin, to improve the crush strength of the catalyst under commercial operating conditions. Said material, i.e. clays, oxides, etc., function as binders for the catalyst. It is desirable to provide a catalyst having good crush strength because in a petroleum refinery the catalyst is often subjected to rough handling, which tends to break the catalyst down into powder-like materials, which cause problems in processing. These clay binders have been employed normally only for the purpose of improving the crush strength of the catalyst.

Naturally-occurring clays which can be composited with the new silico-crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

Binders useful for compositing with the new silico-crystal also include inorganic oxides, notably alumina.

In addition to the foregoing materials, the silico-crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided silico-crystal and inorganic oxide gel matrix vary widely with the silico-crystal content ranging from about 1 to about 90 perent by weight and more usually, particularly when the composite is prepared in the form of beads, in the range of about 2 to about 70 percent by weight of the composite.

Employing a catalytically active form of the composition of this invention containing a hydrogenation component, reforming stocks can be reformed employing a temperature between 300° C. and 600° C. The pressure can be between 100 and 1000 psig but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g., platinum. Hydroisomerization is carried out at a temperature between 100° and 400° C., preferably 150° to 300° C., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin or aromatic isomerization employing temperatures between 50° and 400° C.

The catalyst can also be used for reducing the pour-point of gas oils. This reduction is carried out at a liquid hourly space velocity between about 10 and about 30 and a temperature between about 400° and about 600° C.

Other reactions which can be accomplished employing the catalyst of this invention with or without a metal, e.g., platinum, or palladium, include hydrogenation-dehydrogenation reactions and desulfurization reactions, olefin polymerization (oligomerization), aromatics alkylation with $C_2$–$C_{12}$ olefins or with $C_1$–$C_{12}$ alcohols, aromatics isomerization, disproportionation, and transalkylation and other organic compound conversion such as the conversion of alcohols (e.g. methanol) to hydrocarbon.

In order to more fully illustrate the nature of the invention and the manner of practicing same, the following examples are presented, wherein porous ZSM-48 silico-crystals of good crystallinity were prepared from mixes of the composition range:

(0.1 to 0.5)RN: (0.3 to 0.8)Na$_2$O: (0 to 0.02)Al$_2$O$_3$ SiO$_2$: (20 to 70)H$_2$O wherein RN is a $C_1$–$C_{20}$ organic compound containing at least one amine functional group of $pK_a \geq 7$.

In the examples which follow whenever adsorption date are set forth for comparison of sorptive capacities for water, cyclohexane and n-hexane, they were determined after dehydration to at least 200° C. and at a sorbate partial pressure of 10–20 mm.

EXAMPLES 1–17

In these examples, the starting gel reaction mixture was prepared from sodium silicate (27.8% SiO$_2$, 8.4% Na$_2$O, 64% H$_2$O), $C_3$–$C_{12}$ diamine compounds, sodium hydroxide and water. Crystallization was carried out in a stainless steel autoclave (160° C.). After crystallization, the solids were separated from any unreacted components by filtration and then water washed followed by drying at about 100° C. The amounts of starting material, identification of same, product characterizations and reaction times are listed in Table 2 set forth hereinbelow.

Figure 2:
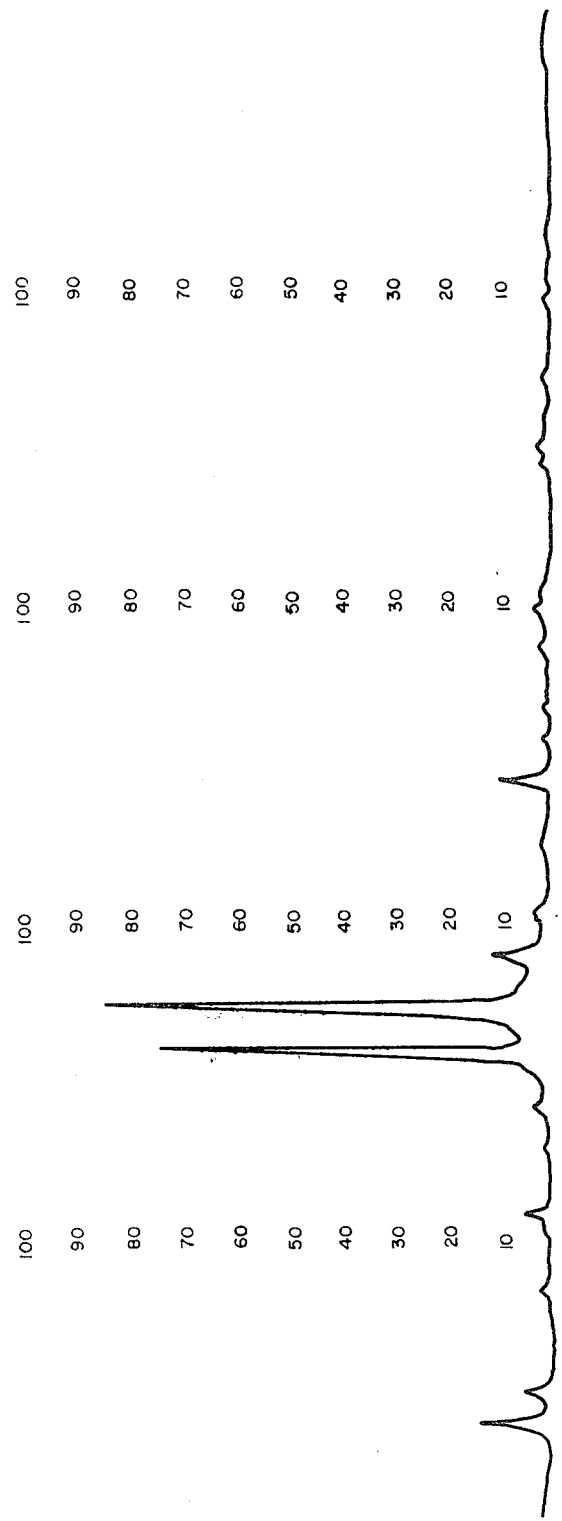

The x-ray diffraction patterns of the products of Examples 5 and 7 were run whose scans are shown in FIGS. 1 and 2, respectively, and whose value are shown in Table 3 below. Analytical and sorption data of the products are listed in Table 4 set forth herein (Examples 18–25).

TABLE 2

Crystallization with Diamines 160° C., stirred, Q-brand (27.8% SiO$_2$, 8.4% Na$_2$O, 64% H$_2$O)

Reaction Mixture Composition[a]

| Ex. | Al$_2$O$_3$/SiO$_2$ | OH/SiO$_2$ | R | Days | Product |
|---|---|---|---|---|---|
| 1 | 0 | 0 | None | 2 | Amorphous |
| 2 | 0 | 0 | C$_3$DN | 3 | Dense phase |
| 3 | 0 | 0 | C$_4$DN | 3 | ZSM-48 |
| 4 | 0 | 0 | C$_5$DN | 2 | ZSM-48 |
| 5 | 0 | 0 | C$_6$DN | 2 | ZSM-48 |
| 6 | 0 | 0 | C$_7$DN | 2 | ZSM-48 |
| 7 | 0 | 0 | C$_8$DN | 2 | ZSM-48 |
| 8 | 0 | 0 | C$_9$DN | 2 | ZSM-48 |
| 9 | 0 | 0 | C$_{10}$DN | 3 | ZSM-48 |
| 10 | 0 | 0 | C$_{12}$DN | 3 | [b] |
| 11 | 0.002 | 0 | C$_8$DN | 3 | ZSM-48 |
| 12 | 0.005 | 0 | C$_8$DN | 2 | 40%, ZSM-48 60% ZSM-11 |
| 13 | 0.005 | 0 | C$_5$DN | 2 | 10% ZSM-11 90% ZSM-5 |
| 14 | 0 | 0.30 | C$_5$DN | 2 | 30% ZSM-5 |
| 15 | 0 | 0.15 | C$_5$DN | 2 | 15% ZSM-5 |
| 16 | 0 | 0.30 | C$_8$DN | 2 | 50% ZSM-11 |
| 17 | 0 | 0.15 | C$_8$DN | 2 | ZSM-48 10% ZSM-11 |

[a] H$_2$O/SiO$_2$ = 40, Na/SiO$_2$ = 0.59, R/SiO$_2$ = 0.30
[b] ZSM-48 and second unidentified component

TABLE 3

X-RAY DIFFRACTION DATA OF ZSM-48

| Product of Example 7 | | | Product of Example 5 | | |
|---|---|---|---|---|---|
| 2θ | D | INT | 2θ | D | INT |
| 7.45 | 11.87 | 14 | 7.42 | 11.91 | 15 |
| 8.65 | 10.22 | 6 | 8.60 | 10.28 | 7 |
| 12.26 | 7.22 | 2 | 12.26 | 7.22 | 3 |
| 14.46 | 6.13 | 1 | 14.42 | 6.14 | 2 |
| 15.06 | 5.88 | 6 | 15.06 | 5.88 | 6 |
| 17.45 | 5.08 | 1 | 17.47 | 5.08 | 1 |
| 19.05 | 4.66 | 4 | 19.01 | 4.67 | 4 |
| 21.13 | 4.20 | 76 | 21.18 | 4.19 | 84 |
| 22.74 | 3.91 | 100 | 22.77 | 3.91 | 100 |
| 24.74 | 3.60 | 12 | 24.73 | 3.60 | 13 |
| 25.70 | 3.47 | 2 | 25.75 | 3.46 | 2 |
| 26.10 | 3.41 | 3 | 26.15 | 3.41 | 3 |
| 26.36 | 3.38 | 3 | 26.38 | 3.38 | 4 |
| 27.60 | 3.23 | 1 | 27.65 | 3.23 | 1 |
| 28.83 | 3.10 | 2 | 28.84 | 3.10 | 3 |
| 31.32 | 2.86 | 11 | 31.33 | 2.86 | 13 |
| 32.83 | 2.73 | 2 | 32.88 | 2.72 | 2 |
| 34.05 | 2.63 | 2 | 34.05 | 2.63 | 2 |
| 35.44 | 2.53 | 1 | 35.48 | 2.53 | 1 |
| 36.30 | 2.47 | 2 | 36.30 | 2.47 | 3 |
| 37.66 | 2.39 | 3 | 37.70 | 2.39 | 3 |
| 38.40 | 2.34 | 2 | 38.40 | 2.34 | 2 |
| 43.18 | 2.10 | 2 | 43.25 | 2.09 | 3 |
| 43.77 | 2.07 | 3 | 43.83 | 2.07 | 4 |

TABLE 3-continued
X-RAY DIFFRACTION DATA OF ZSM-48

| Product of Example 7 | | | Product of Example 5 | | |
|---|---|---|---|---|---|
| $2\theta$ | D | INT | $2\theta$ | D | INT |
| 44.58 | 2.03 | 1 | 44.82 | 2.02 | 1 |
| 45.12 | 2.01 | 1 | | | |
| 46.30 | 1.96 | 2 | 46.37 | 1.96 | 2 |
| 49.22 | 1.85 | 2 | 49.22 | 1.85 | 2 |
| 50.07 | 1.82 | 1 | 50.12 | 1.82 | 1 |
| 51.56 | 1.77 | 1 | 51.57 | 1.77 | 1 |

A review of the foregoing data in Table 2 shows that (1) no porous silico-crystal crystallized out without the diamine starting material (Ex. 1) (2) $C_4$-$C_{10}$ diamines yielded ZSM-48 in good crystallinity (Ex. 3-9) (3) ZSM-48 can be prepared with added aluminum although with these diamines, ZSM-5 (Ex. 13) or ZSM-11 (Ex. 12) may be preferred, depending on reaction mixture composition, and (4) that an optimum $OH/SiO_2$ ratio exists near zero.

EXAMPLE 26

This example shows that very different types of amines are effective in ZSM-48 synthesis. A reaction mixture was prepared as in Examples 1-17 except that the amine was $N,N^1$-bis(3-aminopropyl) piperazine. Mole ratios of reactants were as follows:

$Al_2O_3/SiO_2 = 0$
$H_2O/SiO_2 = 40$
$OH/SiO_2 = 0$
$Na/SiO_2 = 0.6$
$R/SiO_2 = 0.3$ after 2 days at 160° C. in a stirred autoclave, ZSM-48 was obtained in good crystallinity.

EXAMPLE 27

This example shows that simple amines are effective in ZSM-48 synthesis. A reaction mixture was prepared according to the procedures of Examples 1-17 except that the organic was n-hexylamine. The reaction mixture composition had the following mole ratios:

$Al_2O_3/SiO_2 = <0.01$
$H_2O/SiO_2 = 40$
$OH/SiO_2 = 0$
$Na/SiO_2 = 0.6$
$R/SiO_2 = 0.3$

Crystallization was conducted in a stirred autoclave at 160° C. for 2 days. The crystalline product was ZSM-48, contaminated with a minor portion of $\alpha$-cristobabte.

EXAMPLE 28

The composition obtained from the exercise of Example 7 was tested for relative hexane cracking activity ($\alpha$-value), and for constraint index (the ratio of the rate constant for cracking of n-hexane to that of 3-methylpentane) at 510° and at 538° C.*.

Catalytic cracking activity is indicated by the weight percent conversion of hexane to lower boiling $C_1$-$C_5$ hydrocarbons, while isomerization activity is indicated by weight percent conversion to hexane isomerization. Cracking activity is also indicated quantitatively by the term alpha ($\alpha$) which is an approximate indication of the catalytic cracking activity of the catalyst compared to a standard catalyst, is the relative rate constant (rate of n-hexane conversion per unit volume of oxides composition per unit time). It is based on the activity of highly active silica alumina cracking catalyst taken as $\alpha = 1$. At 510° C., the ZSM-48 product of exhibited a constraint index of 5.3 and an $\alpha = 5.0$. At 538° C., the C.I. was 3.4.

TABLE 4

| | Characterization Data | | | | | | | | |
|---|---|---|---|---|---|---|---|---|---|
| | | Composition$^a$ | | | | Sorption, % (25° C.)$^b$ | | | |
| Example | $SiO_2/Al_2O_3$ | Al | Na | N | $DN^c$ | NC6 | CyC6 | $H_2O$ | $\alpha^*$ |
| 18 (Product of Example 4) | 870 | 0.23 | 0.8 | 6.9 | 3.6 | 3.7 | — | — | — |
| 19 (Product of Example 5) | 1320 | 0.15 | 0.7 | 6.2 | 3.3 | 2.5 | 1.7 | 1.4 | — |
| 20 (Product of Example 6) | 1340 | 0.15 | 0.5 | 5.6 | 3.0 | 3.0 | — | — | — |
| 21 (Product of Example 2) | 400 | 0.51 | 0.4 | 6.2 | 3.4 | — | — | — | — |
| 22 (Product of Example 7) | 1170 | 0.17 | 0.7 | 5.9 | 3.0 | 3.6 | 2.8 | 1.1 | 1.2 |
| 23 (Product of Example 8) | 1190 | 0.17 | 0.5 | 5.0 | 2.7 | — | — | — | — |
| 24 (Product of Example 9) | 1290 | 0.17 | 0.5 | 5.2 | 2.7 | — | — | — | — |
| 25 (Product of Example 3) | 910 | 0.17 | 0.3 | 1.4 | 2.6 | 3.3 | — | — | — |
| | | | Average | | 3.1 | | | | |

$^a$Per 100 $SiO_2$
$^b$Hydrocarbons, 20 mm; water, 12 mm
$^c$Diamine (per 100 $SiO_2$)

EXAMPLE 29

Two gms of the dried product of Example 5 were calcined in nitrogen for 2½ hours at 550° C. followed by cooling in nitrogen for about 30 minutes. The calcined sample was ion exchanged three times with stirring at 80° C. with 100 ml 2 N sodium nitrate, for 2 hours each time. The sodium form sample was filtered, washed with water and dried under a heat lamp for about 30 minutes.

Figure 3:
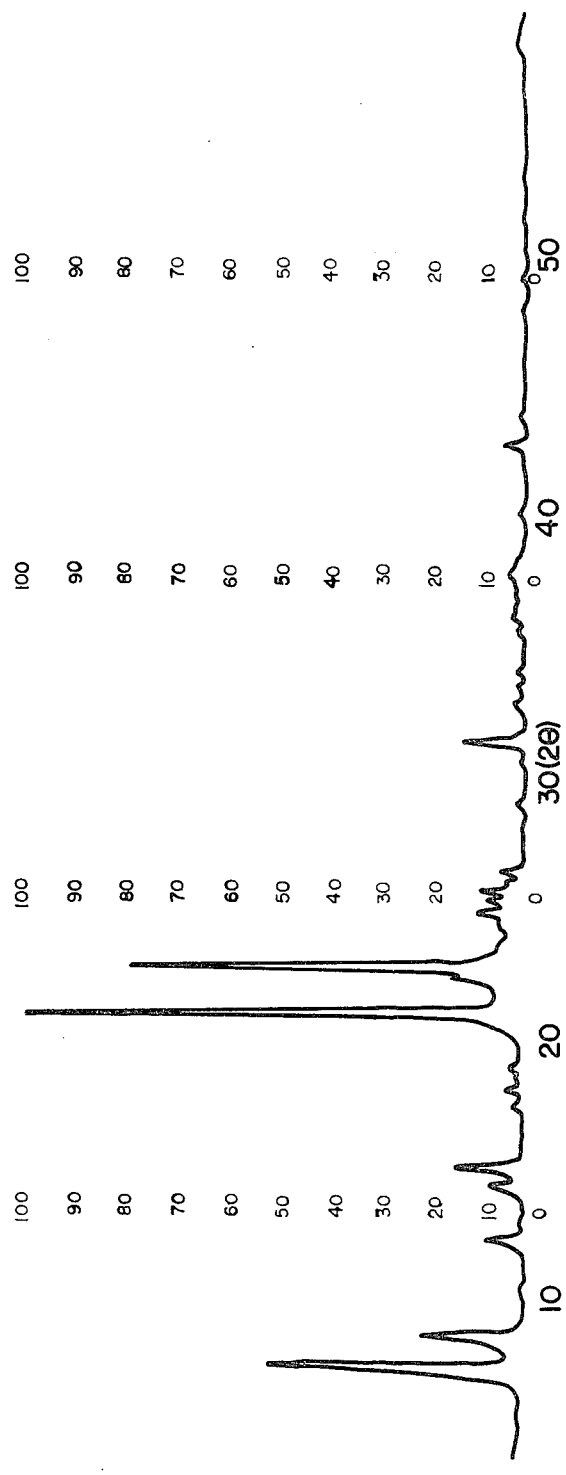

The X-ray diffraction data of the calcined sodium-exchange form is given below in Table 5, and the X-ray scan is shown in FIG. 3.

TABLE 5
X-Ray Diffraction Data of ZSM-48
Product of Example 29 (Na-Exchanged)

| $2\theta$ | D | INT |
|---|---|---|
| 7.56 | 11.69 | 43 |
| 8.74 | 10.12 | 18 |
| 10.66 | 8.30 | 1 |
| 12.33 | 7.18 | 7 |
| 13.09 | 6.76 | 1 |
| 13.58 | 6.52 | 1 |
| 14.51 | 6.10 | 6 |
| 15.15 | 5.85 | 12 |
| 16.92 | 5.24 | 1 |
| 17.52 | 5.06 | 2 |
| 18.12 | 4.90 | 3 |
| 18.65 | 4.76 | 2 |
| 19.02 | 4.67 | 3 |
| 19.36 | 4.58 | 1 |
| 19.82 | 4.48 | 1 |
| 20.54 | 4.32 | 5 |
| 21.13 | 4.20 | 100 |
| 21.82 | 4.07 | 4 |
| 22.47 | 8.96 | 12 |

TABLE 5-continued

X-Ray Diffraction Data of ZSM-48
Product of Example 29
(Na-Exchanged)

| 2θ | D | INT |
|---|---|---|
| 22.93 | 3.88 | 72 |
| 23.82 | 3.74 | 3 |
| 24.18 | 3.68 | 3 |
| 24.56 | 3.62 | 5 |
| 24.96 | 3.57 | 8 |
| 25.34 | 3.51 | 6 |
| 25.74 | 3.46 | 8 |
| 26.11 | 3.41 | 3 |
| 26.51 | 3.36 | 5 |
| 27.96 | 3.19 | 1 |
| 29.01 | 3.08 | 2 |
| 30.66 | 2.92 | 1 |
| 31.35 | 2.85 | 12 |
| 31.64 | 2.83 | 1 |
| 32.61 | 2.76 | 2 |
| 32.89 | 2.72 | 2 |
| 33.56 | 2.67 | 1 |
| 34.11 | 2.63 | 2 |
| 35.66 | 2.52 | 1 |
| 36.20 | 2.48 | 3 |
| 36.57 | 2.46 | 2 |
| 37.05 | 2.43 | 2 |
| 37.48 | 2.40 | 2 |
| 37.89 | 2.37 | 3 |
| 38.38 | 2.35 | 2 |
| 38.92 | 2.31 | 1 |
| 40.31 | 2.24 | 1 |
| 43.02 | 2.10 | 4 |
| 44.03 | 2.06 | 2 |
| 45.05 | 2.01 | 1 |
| 45.96 | 1.97 | 1 |
| 46.48 | 1.95 | 1 |
| 48.11 | 1.89 | 1 |
| 49.28 | 1.85 | 1 |
| 51.69 | 1.77 | 1 |

EXAMPLE 30

Two gms of the dried product of Example 7 were calcined for 4 hours in nitrogen at 550° C. followed by cooling in ammonium gas for about 30 minutes. The calcined samples was exchanged twice with 100 ml 1 N ammonium nitrate solution, at 80° C. with stirring for about 2 hours for each exchange. The ammonium form sample was then washed, dried and again calcined for 2 hours at 550° C. in nitrogen and cooled in nitrogen. This calcined sample was ion exchanged 3 times with stirring at 80° C. in 2 N sodium nitrate solution. The sodium form sample was filtered, washed with water and dried under a heat lamp for about 30 minutes.

Figure 4:
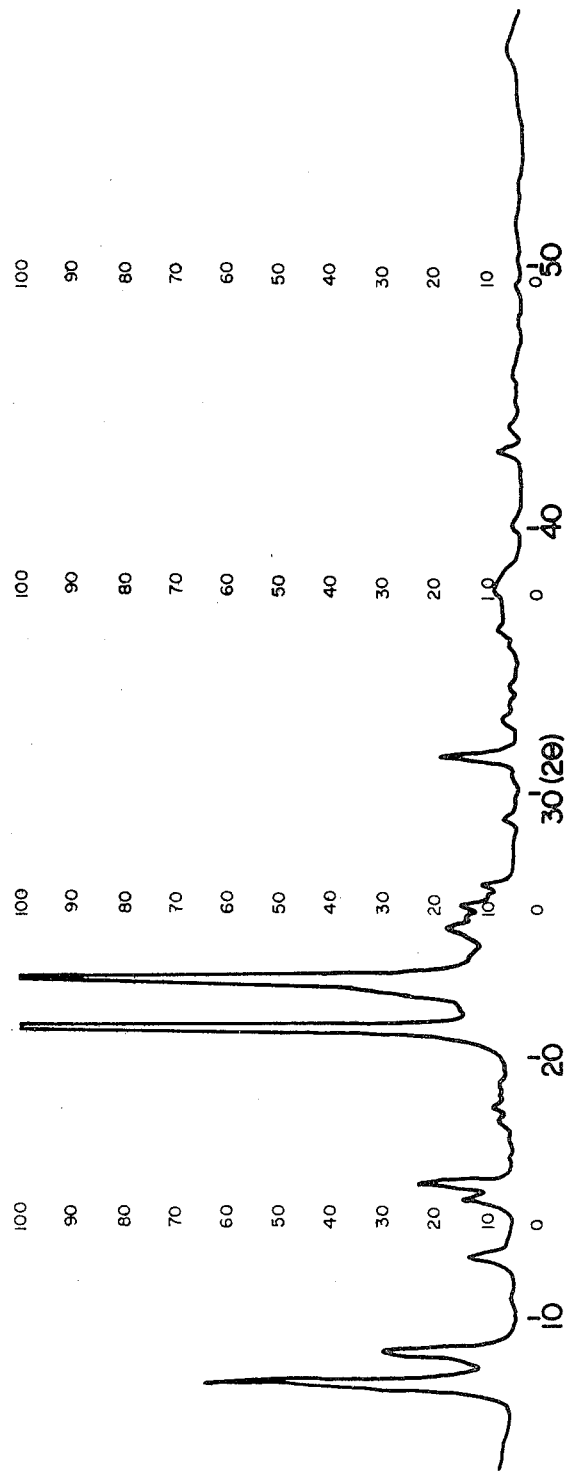

The X-ray diffraction data of the calcined sodium-exchange form is given below in Table 6, and the X-ray scan is shown in FIG. 4.

TABLE 6

X-Ray Diffraction Data of ZSM-48
Product of Example 30
(Na-Exchanged)

| 2θ | D | INT |
|---|---|---|
| 7.53 | 11.74 | 48 |
| 8.71 | 10.15 | 18 |
| 10.70 | 8.27 | 1 |
| 12.30 | 7.20 | 7 |
| 13.04 | 6.79 | 1 |
| 13.62 | 6.50 | 1 |
| 14.52 | 6.10 | 8 |
| 15.10 | 5.87 | 14 |
| 16.90 | 5.25 | 1 |
| 17.53 | 5.06 | 3 |
| 18.10 | 4.90 | 3 |
| 18.64 | 4.76 | 2 |
| 19.06 | 4.66 | 2 |
| 19.62 | 4.52 | 2 |
| 20.07 | 4.42 | 2 |
| 20.47 | 4.34 | 5 |
| 21.10 | 4.21 | 100 |
| 21.93 | 4.05 | 7 |
| 22.41 | 3.97 | 12 |
| 22.91 | 3.88 | 77 |
| 23.82 | 3.74 | 4 |
| 24.16 | 3.68 | 4 |
| 24.52 | 3.68 | 6 |
| 24.90 | 3.58 | 10 |
| 25.32 | 3.52 | 7 |
| 25.72 | 3.46 | 8 |
| 26.10 | 3.41 | 4 |
| 26.50 | 3.36 | 6 |
| 29.04 | 3.07 | 2 |
| 30.71 | 2.91 | 1 |
| 31.35 | 2.85 | 12 |
| 32.55 | 2.75 | 1 |
| 32.84 | 2.73 | 2 |
| 33.56 | 2.67 | 1 |
| 34.14 | 2.63 | 2 |
| 35.64 | 2.52 | 2 |
| 36.20 | 2.48 | 3 |
| 36.59 | 2.46 | 2 |
| 37.00 | 2.48 | 2 |
| 37.40 | 2.40 | 2 |
| 37.85 | 2.38 | 4 |
| 38.34 | 2.35 | 3 |
| 38.86 | 2.32 | 1 |
| 40.33 | 2.24 | 1 |
| 43.04 | 2.10 | 4 |
| 44.06 | 2.06 | 2 |

What is claimed is:

1. A method for preparing a porous silico-crystal characterized by an x-ray diffraction pattern whose values are set forth in Table 1 of the specification which comprises preparing a substantially alumina-free reaction mixture containing a source of a silica, an alkali metal oxide, RN, water and having a composition in terms of mole ratios of oxides, falling within the following ranges:

$Al_2O_3/SiO_2 = 0$
$Na/SiO_2 = 0$ to 2.0
$OH^-/SiO_2 = 0$ to 0.1
$H^+(added)/SiO_2 = 0$ to 0.2
$H_2O/SiO_2 = 10$ to 100
$RN/SiO_2 = 0.01$ to 2.0 wherein RN is an organic diamine of the formula $NH_2-C_nH_{2n}-NH_2$ and wherein n=4 to 12 and maintaining said mixture at crystallization temperature until crystals of said silico-crystal are formed.

2. A method according to claim 1 wherein RN further comprises an organic diamine of the formula $NH_2-C_nH_{2n}-NH_2$ and wherein n=4 to 10.

* * * * *